United States Patent [19]

Lee

[11] 4,134,643
[45] Jan. 16, 1979

[54] FOLDABLE ROAD REFLECTOR DEVICE

[76] Inventor: Nelly W. Lee, 911 Hawkins Ave., Lake Grove, N.Y. 11755

[21] Appl. No.: 805,273

[22] Filed: Jun. 10, 1977

[51] Int. Cl.² ............................................. G02D 5/12
[52] U.S. Cl. .................................... 350/97; 40/10 R; 116/63 P; 404/12
[58] Field of Search ......................... 350/97, 102–105, 350/202, 199, 106, 275; 404/12–15; 116/63 P, 12–15, 63 R, 93; 40/11 A, 10 R

[56] References Cited

U.S. PATENT DOCUMENTS

| 2,525,728 | 10/1950 | Sauer | 116/63 P |
| 2,718,080 | 9/1955 | Eaton | 116/63 P |
| 2,884,835 | 5/1959 | Rupert | 350/103 |
| 2,898,879 | 3/1957 | Murray | 116/63 P |
| 3,056,377 | 10/1962 | Nelson | 116/63 P |
| 3,056,495 | 10/1962 | Malachowski | 350/97 |

Primary Examiner—John K. Corbin
Assistant Examiner—B. W. de los Reyes
Attorney, Agent, or Firm—Max Fogiel

[57] ABSTRACT

A foldable reflector for roads and highways in which the reflecting member is mounted on a panel held vertically on a supporting base. The panel is abutted on both sides by hinged wire stands which are spring-loaded to bear against the panel so as to keep it in a central and upright position.

10 Claims, 3 Drawing Figures

FOLDABLE ROAD REFLECTOR DEVICE

BACKGROUND OF THE INVENTION

In the use of reflectors for placement on roads or highways in the event of emergencies, it is desirable to have available a reflector which is compact in construction so that it may be readily stored within small spaces of a motor vehicle for possible future use. When a motor vehicle becomes accidentally disabled on a highway, for example, it is advantageous to have several such reflectors available which a vehicle operator can distribute along some length of the highway so as to warn other passing vehicles, as well as to summon help. As a result, it is advantageous that such road reflectors be considerably compact so that a number of them can be stored within a small amount of space within the vehicle, and that they can be quickly set up to operative without requiring special tools or skill.

Road reflectors, heretofore, usable for this purpose, have been complex in construction, costly in manufacture, and required special skill to set up to be in operative position.

Accordingly, it is an object of the present invention to provide a foldable road reflector which is substantially simple in construction and may be economically fabricated.

Another object of the present invention is to provide a road reflector of the foregoing character, which is compact and may be stored within a substantially small amount of space.

A further object of the present invention is to provide a road reflector, as described, which is readily maintained in service and has a substantially long useful life.

SUMMARY OF THE INVENTION

A foldable reflector device for the use on roads and highways as a warning or emergency device in which two wire-shaped stands are hinged along one edge and are spring-loaded so as to be urged against a vertically standing panel member bearing reflector elements. The wire-shaped stand has a rectangular structure and abut the panel members so that the latter is maintained in a central upright position on a horizontal base placed on the road or highway surface. A reflector element may be mounted on both sides of the panel member which may be made of plexiglass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
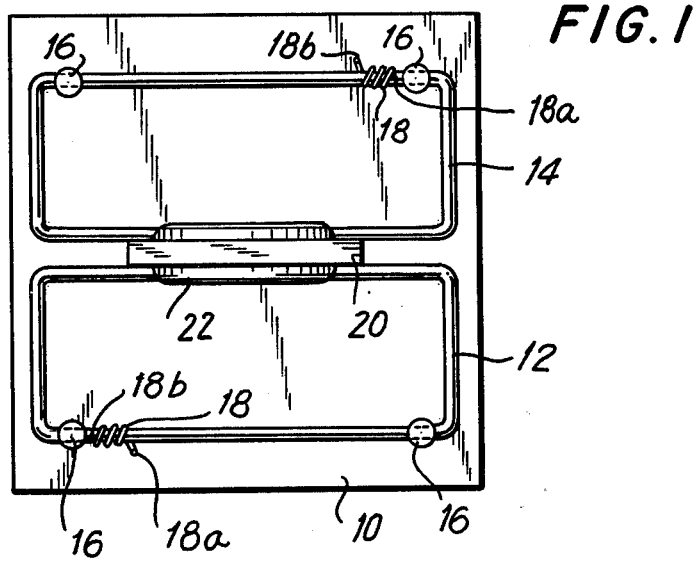
FIG. 1 is a plan view of the foldable reflector device, in accordance with the present invention.
Figure 2:
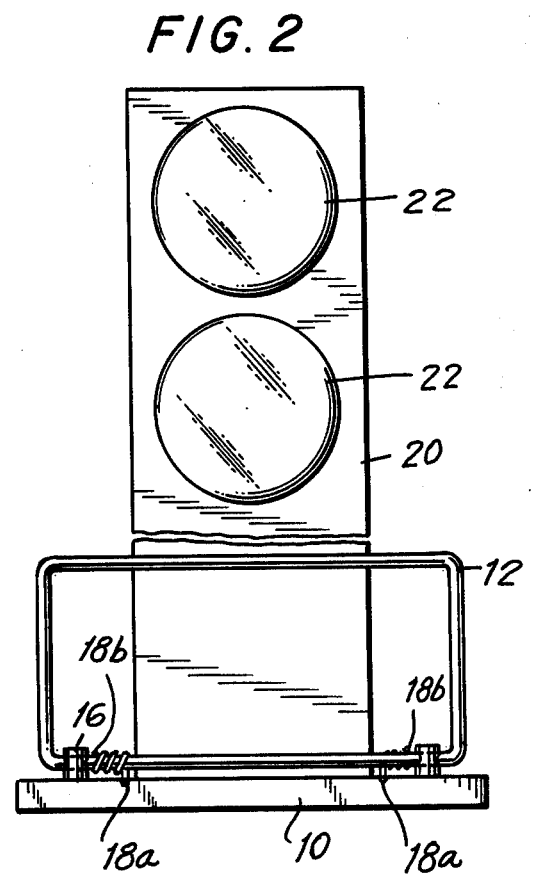
FIG. 2 is a front view of the reflector device of FIG. 1.
Figure 3:
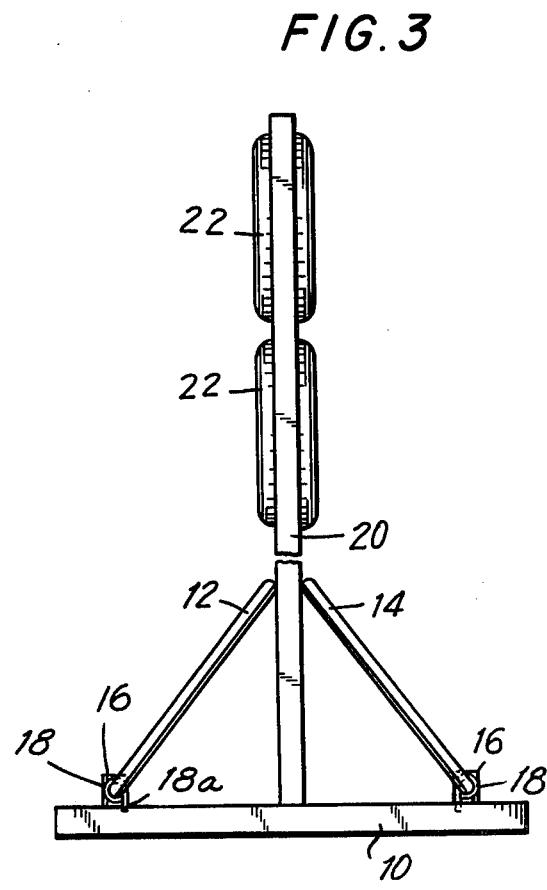
FIG. 3 is a side view of the reflector device and shows the wire stand abutting the reflector bearing panel member, in accordance with the present invention.

Referring to the drawings, the reflector device in accordance with the present invention, has a base plate 10 on which are mounted supporting arms or stands 12 and 14. These supporting arms may be constructed of wire and have a rectangular shape as shown in the drawings.

The supporting arms are hinged or pivoted in bearings 16 fixed to the base plate 10.

Coiled springs 18 are provided on each of the supporting arms 12 and 14 which urge the arms to be rotated towards the base plate. Thus, the action of springs 18 is such that it takes force to rotate the arms 12 and 14 away from the upper surface of the base plate.

In the central location of the base plate, is a vertically standing panel-shaped member 20 which carries a reflector element 22. This panel-shaped member 20 may be constructed of plexiglass, for example. The panel-shaped member 20 may be separate member which is not attached to the base plate 10. To use the reflector device of the present invention in case of emergency, for example, the stands or supporting arms 12 and 14 are lifted and rotated away from the upper surface of the base plate 10 by an amount sufficient to allow the panel-shaped member 20 to be slipped or inserted therebetween. Once the panel-shaped member 20 is in place, the arms 12 and 14 are released and allowed to bear against the panel-shaped member 20. If springs 18 of equal magnitude on the arms 12 and 14 are allowed to act, they cause the arms 12 and 14 to abut the member 20 so that the latter is held firmly in position on the base plate 10, at substantially a central position. At the same time, the panel-shaped member 20 is held in a vertical upright position, so that the reflector elements lie substantially in a vertical plane.

In thus assembling the reflector device, in accordance with the present invention, it is not necessary that the supporting arms 12 and 14 be raised by equal amounts in order to admit the panel-shaped member 20 therebetween. It is also not essential that the panel-shaped member 20 be initially placed in a central position on the base plate 10. Once the panel-shaped member 20 is inserted or slipped between the arms 12 and 14, the springs 18 will position the panel-shaped member symmetrically by applying equal forces on the arms 12 and 14, so that the panel member 20 becomes automatically positioned in a central position while being vertically upright.

The base plate 10 may be in the form of a square-shaped member or a rectangular-shaped member, for example. The arms 12 and 14 may be made solid panels, or they may be in the form of wire shape to conform to rectangles, as shown in the drawings. Such wire-shaped rectangles result in light-weight and simple construction.

The coil springs 18 may, for example, be wound on the lower horizontal portion of the arm, for example, with one end connected to the base plate 10, and the other end connected to the arm, so that rotating the arm away from the base plate 10 results in a resistive force. Thus, end 18a of spring 18 is attached to the base plate 10, whereas end 18b of spring 18 is attached to the lower portion of the arm, for example.

The base plate 10 may be constructed of aluminum for obtaining light-weight construction. The panel-shaped member 20 may carry a reflector element 22 on both sides thereof, and additional refelector elements may be mounted adjacent to each other to increase the reflectivity effect.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and therefore, such adaptations should and are intended to be comprehended within the meaning and range of equivalence of the following claims.

What we claim is:

1. A road reflector device comprising, in combination: a base member; bearing means on said base member; two pivotable supporting arms held in said bearing means; said pivotable supporting arms being comprised of bent wire; spring means connected to said supporting arms for urging said arms toward an upper surface of said base member; said two arms being urged by said springs to pivot in opposite rotational directions; a vertical member held in standing position on said base member when abutted by said two arms on opposite sides of said vertical member; and light reflector means carried by said vertical member; said base member being a single one-piece plate-shaped member; said vertical member being detached from said base member and standing freely on said base member when in a vertical position, said vertical member standing on said base member free from being structurally connected to said base member, said arms abutting said vertical member at a substantial distance from said base member, said vertical member being freely removable from between said arms without disconnecting said vertical member from said base member, said arms being urged to pivot and contact the upper surface of said base member by said spring means after removal of said vertical member from between said arms, each arm being pivotally held in said bearing means at a substantial distance along the base member from the position of contact of said vertical member with said base member so that said arm forms substantially the hypotenuse of a right triangle having one arm along the base member and one arm along said vertical member; said arms being pivoted to lie against said base member when said vertical member is removed from between said arms; the triangular structure forming supporting means for said vertical member.

2. A road reflector device as defined in claim 1, wherein said vertical member is a substantially plate-shaped member.

3. A road reflector device as defined in claim 1, wherein said supporting arms comprised of bent wire have a rectangular shape.

4. The road reflector device as defined in claim 3, wherein said spring means comprises coiled springs wound on at least one side of said rectangular-shaped wire arm.

5. The road reflector device as defined in claim 4, wherein said arms form acute angles with the horizontal when holding said vertical member in standing position on said base member.

6. The road reflector device as defined in claim 4, wherein said coiled springs have one end connected to said base member and another end connected to said arm.

7. The road reflector device as defined in claim 4, wherein said springs have identical spring characteristics for holding said vertical member in a central position on said base member.

8. The road reflector device as defined in claim 1, wherein said base member is a plate-shaped member.

9. The road reflector device as defined in claim 1, wherein said light reflector means comprises a plurality of reflectors supported by said vertical member.

10. A road reflector as defined in claim 1 wherein said vertical member is a substantially plate-shaped member, said supporting arms comprising bent wire having a rectangular shape, said spring means comprising coiled springs wound on at least one side of said rectangular-shaped wire arm, said arms forming acute angles with the horizontal when holding said vertical member in standing position on said base member, said coiled springs having one end connected to said base member and another end connected to said arm, said springs having identical spring characteristics for holding said vertical member in a central position on said base member, said base member being a plate-shaped member, said light reflector means comprising a plurality of reflectors supported by said vertical member, said vertical member comprising a panel-shaped member, said vertical member being of plexiglass, said base member being of aluminum.

* * * * *